United States Patent Office 3,733,378
Patented May 15, 1973

3,733,378
AMIDO-O-LOWER ALKYL-S-ALLYLMERCAPTO-METHYLTHIOLPHOSPHORIC ACID ESTERS
Gerhard Schrader, Wuppertal-Cronenberg, Ingeborg Hammann, Cologne, and Gunter Unterstenhofer, Opladen, Germany, assignors to Farbenfabriken Bayer Aktiengesellschaft, Leverkusen, Germany
No Drawing. Filed Dec. 2, 1970, Ser. No. 94,533
Claims priority, application Germany, Dec. 24, 1969, P 19 64 835.2
Int. Cl. A01n 9/36; C07f 9/24
U.S. Cl. 260—948                    4 Claims

ABSTRACT OF THE DISCLOSURE

Amidothiolphosphoric acid esters, i.e. amido-O-lower alkyl-S-allylmercaptomethylthiolphosphoric acid esters of the general formula

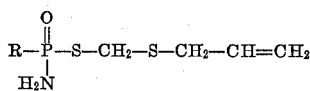

(I)

in which

R denotes an alkoxy radical having 1 to 4 carbon atoms, which possess insecticidal and acaricidal properties.

---

The present invention relates to and has for its objects the provision of particular new amidothiolphosphoric acid esters, i.e. amido-O-lower alkyl-S-allylmercaptomethylthiolphosphoric acid esters which possess insecticidal and acaricidal properties, active compositions in the form of mixtures of such compounds with solid and liquid dispersible carrier vehicles, and methods for producing such compounds and for using such compounds in a new way especially for combating pests, e.g. insects and acarids, with other and further objects becoming apparent from a study of the within specification and accompanying examples.

In German patent specification 1,211,633, there are described amido-O-alkyl-S-propen-(propyn)-ylthiolphosphoric acid esters which are distinguished by a good insecticidal and acaricidal effectiveness.

The present invention provides amidothiolphosphoric acid esters of the general formula

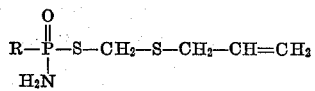

(I)

in which

R denotes a lower alkoxy radical preferably having 1 to 4, and especially 1 to 3 carbon atoms.

Surprisingly, the compounds of the invention compared with the most comparable known compounds, as regards constitution and the direction of activity, are distinguished by outstanding insecticidal and acaricidal effectiveness and a considerably lower phytotoxicity; the invention therefore represents an enrichment of the art.

The present invention also provides a process for the preparation of a compound of the Formula I defined above in which an amidoalkylthiolphosphoric acid salt of the general formula

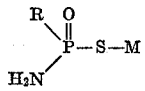

(II)

is reacted with a halomethyl-thioallyl ether (allylmercaptomethyl-halide) of the formula

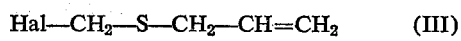

(III)

in which formulae

R has the meaning stated above,

M stands for a monovalent metal equivalent (preferably an alkali metal atom) or the ammonium group, and Hal represents a halogen atom (preferably a chlorine atom).

The reaction described above generally proceeds smoothly and gives good yields of the product.

The process is preferably carried out in the presence of a diluent, which term includes a solvent. For this purpose, good results have been obtained with polar organic solvents, for example lower aliphatic alcohols, ketones and nitriles, such as methanol, ethanol, acetone, methylethyl ketone, acetonitrile, and the like.

Furthermore, for the purpose of completing the reaction, and thus for the attainment of good yields and the obtaining of pure products, it is advantageous to carry out the reaction at room temperature or at a slightly to moderately elevated temperature (about 20 to 100° C., preferably about 50 to 80° C.) and to continue, after mixing the starting materials, the stirring of the reaction mixture for a long period, optionally with heating under reflux.

Working up of the mixture, after cooling it to room temperature, may take place in a manner known in principle by first diluting the mixture with another organic solvent. Especially suitable for this purpose are low-boiling aliphatic chlorinated hydrocarbons, such as methylene chloride, chloroform, carbon tetrachloride, and tri- and tetra-chloroethane. The solution is then washed with water, and the organic layer is dried. After drying of the organic phase and evaporation of the solvent under reduced pressure, the reaction product remains behind mostly in the form of a colorless to slightly colored oil which can either be distilled or, at least, be freed from the last volatile impurities by being heated to slightly to moderately elevated temperatures (expediently about 40 to 80° C.).

The amidoalkylthiolphosphoric acid salts required as starting materials for the production of the compounds of the invention can be prepared, for example, according to the particulars given in German patent specification 1,077,215 by hydrolysis of the appropriate dialkylthionophosphoric acid amides of the general formula

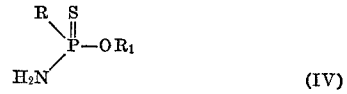

(IV)

in which

R has the meaning stated above, and
$R_1$ stands for a lower alkyl radical, with aqueous or alcoholic solutions of alkali, preferably in the presence of solvents or diluents and at temperatures between about 20° and 70° C. Suitable here as the hydrolyzing agents are, above all, solutions of sodium hydroxide or solutions of potassium hydroxide as well as concentrated ammonia, while, as solvents, the same inert organic solvents as mentioned above can be used.

The halomethylthiolallyl ethers (III)—of which the chloro compound is preferred—used as reagents are readily obtainable, in a manner known in principle, from allylmercaptan, formaldehyde and dry hydrogen halide, preferably hydrogen chloride.

As already mentioned, the amidothiolphosphoric acid esters according to the invention are distinguished by an outstanding insecticidal and acaricidal activity, especially against sucking and eating insects, Diptera and mites for example aphids, spider mites, caterpillars and flies. The compounds of the invention possess both a very good contact-insecticidal and an excellent systemic activity. On the other hand, they show only a comparatively low phytotoxicity.

By reason of these properties, the compounds according to the invention may be used as pesticides, especially in crop protection, as well as against pests harmful to health and pests of stored products.

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the mealy apple aphid *ASappaphis mail*), the mealy plum aphid (*Hyalopterus arundinis*) and the cherry black-fly (*Myzus cerasi*); in addition, scales and melybugs (Coccina), for example the oleander scale (*Aspidiotus hederae*) and the soft scale (*Lecanium hesperdium*) as well as the grape mealybug (*Pseudococcus maritimus*); trips (Thysanoptera), such as *Hercinothrips femoralis*, and bugs, for example, the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus;* and the like.

In the case of the biting insects, above all there should be mentioned butterfly caterpillars (Lepidoptera) such as the diamond-black moth (*Plutella maculipennis*), the gypsy moth (*Lymantria dispar*), the brown-tail moth (*Euproctis chrysorrhoea*)and the tent caterpillar (*Malacosoma neustria*); further, the cabbage moth (*Mamestra brassicae*) and the cutworm (*Agrotis segetum*), the large white butterfly (*Pieris brassicae*), the smaller winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestix kühniella*) and greater wax moth (*Galleria mellonella*); and the like.

Also to be classed with the biting insects are beetles (Coleoptera), for example the granary weevil (*Sitophilus granarius=Calanadra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius=Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toother brain bettle (*Oryzaephilus surinamensis*), and also species living in the soil, for example wireworms (*Agriotes spec.*) and larvae of the cockchater (*Melolontha melolontha*); cockroaches, such as the German cockroach (*Blattella germanica*), American cockroach (*Periplaneta americana*), Madeira cockroach (*Leucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta;* further, Orthoptera, for example, the house cricket (*Acheta domesticus*); termites such as the eastern subterranean termite (*Reticulitermes flavipes*) and Hymenoptera such as ants, for example, the garden ant (*Lasius niger*); and the like.

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and the bluebottle fly (*Calliphora erythrocephala*), as well as the stable fly (*Stomoxys calcitrans*); further, gnats for example, mosquitoes such as the yellow fever mosquito (*Aedes aegypti*), the northern house mosquito (*Cluex pipiene*), the malaria mosquito (*Anopheles stephensi*); and the like.

With the mites (Acari) there are classed, in particular, the spider mites (Tetranychidae) such as the two-spotted spider mite (*Tetranychus telarius=Tetranychus althaeae* or *Tetranychus urticae*) and the European red mite (*Paratetranychus pilosus=Panonychus ulmi*), bliste mites, for examples, the current blister mite (*Eriophyes ribis*) and tarsonemids, for example, the broad mite (*Hemitarsonemus latus*) and the cyclamen mite (*Tarsonemus pallidus*); finally, ticks, such as the relapsing fever tick (*Ornithodorus moubata*); and the like.

When applied against pests harmful to health and pests of stored products, especially flies and mosquitoes, the compounds are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromati c hydrocarbons (e.g. chloro-benzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketone (e.g. acetone, etc.) and/or water, as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or such solid and/or liquid dispersible carrier vehicles and/or with other known compatible active agents, especially plant protection agents, such as other acaricides, insecticides, rodenticides, plant growth-inhibiting agents, or fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.00001–20%, preferably 0.01–5%, by weight of the mixture. Thus, the present invention contemplates overall compositions which comprise mixtures of a conventional dispersible carrier-vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example, by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

In particular, the present invention contemplates methods of selectively killing, combating or controlling pests, e.g. arthropods, i.e. insects and acarids, as well as rodents (and even growth inhibition of plants at higher concentrations), and more particularly, methods of combating at least one of insects and acarids which comprises applying to at least one of correspondingly (a) such insects, (b) such acarids, and (c) the corresponding habitat, i.e. the locus to be protected, a corresponding combative or toxic amount, i.e. an arthropodicidallly, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated without limitation by the following examples:

EXAMPLE 1

Plutella test

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamond-back moth (*Plutella maculipennis*).

After the specified periods of time, the degree of destruction is determined as a percentage: 100% means that all the caterpillars are killed whereas 0% means that none of the caterpillars are killed.

The active compounds, the concentrations of the active compounds, the evluation times and the results can be seen from the following Table 1:

TABLE 1
[Plutella test]

| Active compound | | Concentration of active compound in percent | Degree of destruction in percent after 3 days |
|---|---|---|---|
| $C_2H_5O-\overset{O}{\underset{CH_3NH}{\overset{\|}{P}}}-S-CH_2-CH=CH_2$ (known) | (A) | 0.1<br>0.01 | 100<br>0 |
| $CH_3O-\overset{O}{\underset{H_2N}{\overset{\|}{P}}}-S-CH_2-S-CH_2-CH=CH_2$ | (1) | 0.1<br>0.01 | 100<br>100 |
| $C_2H_5O-\overset{O}{\underset{H_2N}{\overset{\|}{P}}}-S-CH_2-S-CH_2-CH=CH_2$ | (2) | 0.1<br>0.01 | 100<br>100 |
| $(CH_3)_2CHO-\overset{O}{\underset{H_2N}{\overset{\|}{P}}}-S-CH_2-S-CH_2-CH=CH_2$ | (3) | 0.1<br>0.01 | 100<br>100 |

EXAMPLE 2

Myzus test (contact action)

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 3:

TABLE 3
[Tetranychus test]

| Active compound | | Concentration of active compound in percent | Degree of destruction in percent after 48 hours |
|---|---|---|---|
| $C_2H_5O-\overset{O}{\underset{CH_3NH}{\overset{\|}{P}}}-S-CH_2-CH=CH_2$ (known) | (A) | 0.1 | 20 |
| $CH_3O-\overset{O}{\underset{H_2N}{\overset{\|}{P}}}-S-CH_2-S-CH_2-CH=CH_2$ | (1) | 0.1 | 95 |
| $C_2H_5O-\overset{O}{\underset{H_2N}{\overset{\|}{P}}}-S-CH_2-S-CH_2-CH=CH_2$ | (2) | 0.1<br>0.01 | 100<br>90 |
| $(CH_3)_2CHO-\overset{O}{\underset{H_2N}{\overset{\|}{P}}}-S-CH_2-S-CH_2-CH=CH_2$ | (3) | 0.1 | 100 |

The active compounds, the concentrations of the active compounds, the evaluation times and the results can be seen from the following Table 2:

TABLE 2
[Myzus test/contact action]

| Active compound | | Concentration of active compound in percent | Degree of destruction in percent after 24 hours |
|---|---|---|---|
| $C_2H_5O-\overset{O}{\underset{CH_3NH}{\overset{\|}{P}}}-S-CH_2-CH=CH_2$ (known) | (A) | 0.1<br>0.01 | 98<br>30 |
| $CH_3O-\overset{O}{\underset{H_2N}{\overset{\|}{P}}}-S-CH_2-S-CH_2-CH=CH_2$ | (1) | 0.1<br>0.01<br>0.001 | 100<br>99<br>65 |
| $C_2H_5O-\overset{O}{\underset{H_2N}{\overset{\|}{P}}}-S-CH_2-S-CH_2-CH=CH_2$ | (2) | 0.1<br>0.01<br>0.001 | 100<br>99<br>95 |
| $(CH_3)_2CHO-\overset{O}{\underset{H_2N}{\overset{\|}{P}}}-S-CH_2-S-CH_2-CH=CH_2$ | (3) | 0.1<br>0.01<br>0.001 | 100<br>100<br>95 |

EXAMPLE 3

Tetranychus test

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The following examples illustrate the preparative process of the invention.

EXAMPLE 4

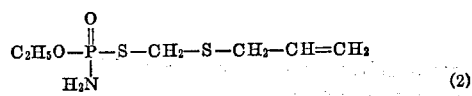
(2)

0.8-molar mixture:

150 g. of potassium amido-O-ethylthiolphosphate are dissolved in 600 cc. of acetonitrile. To this solution there are added at 30° C., with stirring, 98 g. of chloromethylthioallyl ether; the solution is heated to 60° C. for a further 2 hours, with further stirring. The mixture is diluted with 300 cc. of methylene chloride and washed twice with, in each case, 100 cc. of ice water. The methylene chloride solution is dried over sodium sulfate. After the solvent has been distilled off, 150 g. (83% of the theory) of amido-O-ethyl-S-allylmercaptomethylthiolphosphoric acid ester are obtained as a slightly yellow, water-insoluble oil with a refractive index $n_D^{21}$ of 1.5459.

Calculated for a molecular weight of 227 (percent):

P, 13.6; S, 28.2; N, 6.17. Found (percent): P, 13.2; S, 28.6; N, 5.9.

EXAMPLE 5

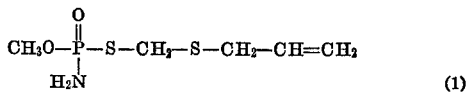
(1)

0.32-molar mixture:

To a solution of 60 g. of potassium amido-O-methylthiolphosphate in 300 cc. of acetonitrile there are added at 25° C., with stirring, 40 g. of chloromethylthioallyl ether. The mixture is heated to 60 to 65° C., for a further 2 hours and then worked up as in the preceding example. There are obtained 41 g. (60% of the theory) of amido-O-methyl-S-allylmercaptomethylthiolphosphoric acid ester in the form of a colorless, water-insoluble oil with a refractive index of $n_D^{24}$ of 1.5598.

Calculated for a molecular weight of 213 (percent): P, 14.5; S, 30.0; N, 6.6. Found (percent): P, 14.1; S, 30.3; N, 6.4.

EXAMPLE 6

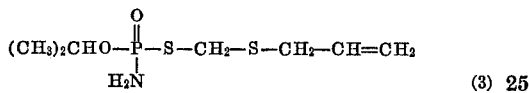
(3)

0·32-molar mixture:

65 g. of potassium amido-O-isopropylthiolphosphate are dissolved in 300 cc. of acetonitrile; to this solution there are added at 25° C., with stirring, 40 g. of chloromethylthioallyl ether and the temperature of the mixture is kept at 65° C. for a further 2 hours, with further stirring. After the customary working-up of the mixture, 41 g. (56% of the theory) of amido-O-isopropyl-S-allylmercaptomethylthiolphosphoric acid ester are obtained as colorless water-insoluble oil with a refractive index $n_D^{23}$ of 1.5411.

Calculated for a molecular weight of 227 (percent): P, 13.6; S, 28.2; N, 6.17. Found (percent): P, 13.3; S, 28.2; N, 5.9.

The chloromethylthioallyl ether required as a starting material is obtainable, for example, as follows:

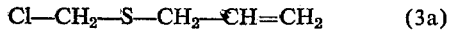
(3a)

2-molar mixture:

150 g. of allylmercaptan are mixed with 60 g. of paraformaldehyde. Hydrogen chloride is introduced at 20 to 25° C., with stirring, into this mixture until the reaction is complete. The mixture is taken up in 200 cc. methylene chloride, the methylene chloride solution is washed once wtih 100 cc. of ice water and dried over sodium sulfate. In the ensuing fractional distillation, the desired product distills over at 50° C. under a pressure of 14 mm. Hg. The yield is 110 g. (46% of the theory); the refractive index $n_D^{24}$ is 1.5051.

It will be appreciated that the instant specification and examples are set forth by way of illustration and not limitation, and that various modifications and changes may be made without departing from the spirit and scope of the present invention.

What is claimed is:

1. An amido-O-lower alkyl-S-allylmercaptomethylthiolphosphoric acid ester.

2. Amido - O - methyl - S - allylmercaptomethylthiolphosphoric acid ester according to claim 1 of the formula

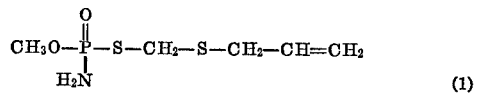
(1)

3. Amido - O - ethyl - S - allylmercaptomethylthiolphosphoric acid ester according to claim 1 of the formula

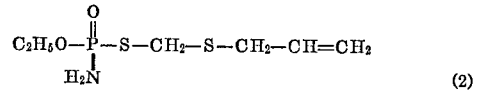
(2)

4. Amido - O - isopropyl - S - allylmercaptomethylthiolphosphoric acid ester according to claim 1 of the formula

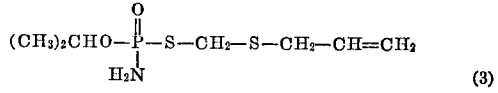
(3)

References Cited

UNITED STATES PATENTS 3,019,250   1/1962   Kayser et al. _____ 260—948 X

LEWIS GOTTS, Primary Examiner

A. H. SUTTO, Assistant Examiner

U.S. Cl. X.R.

424—216